United States Patent [19]
Martin

[11] Patent Number: 4,949,360
[45] Date of Patent: Aug. 14, 1990

[54] SYNCHRONIZING CIRCUIT

[75] Inventor: Gareth R. Martin, Romsey, England

[73] Assignee: International Business Machines Corporation, Armonk, N.Y.

[21] Appl. No.: 390,796

[22] Filed: Aug. 8, 1989

[51] Int. Cl.$^5$ ............................................. H04L 7/06
[52] U.S. Cl. ...................................... 375/106; 328/72; 307/480
[58] Field of Search ............... 375/106, 108, 110, 111, 375/118, 119, 120; 370/100, 108; 328/63, 72; 307/480

[56]          References Cited
         U.S. PATENT DOCUMENTS

| | | | |
|---|---|---|---|
| 3,978,285 | 8/1976 | Tan et al. | 375/119 |
| 3,980,820 | 9/1976 | Niemi et al. | 375/119 |
| 4,215,430 | 7/1980 | Johnson, Jr. | 375/111 |
| 4,426,713 | 1/1984 | Shimizu et al. | 375/106 |
| 4,580,278 | 4/1986 | Yamamoto | 375/106 |
| 4,644,567 | 2/1987 | Artun et al. | 375/119 |
| 4,715,050 | 12/1987 | Tanaka et al. | 375/111 |

Primary Examiner—Douglas W. Olms
Assistant Examiner—Stephen Chin
Attorney, Agent, or Firm—Robert W. Lahtinen

[57]            ABSTRACT

A synchronizing circuit for synchronizing an asynchronous serial two level input signal to a first clock signal employs a majority decoder which receives the asynchronous input signal at one of its inputs. A first latch is enabled by a second phase shifted clock signal to latch the asynchronous input signal to provide a second input to the decoder. A second latch is enabled by the first clock signal to latch the majority decoder output as the synchronized output signal. An inverted version of the output signal is fed back to the third input of the majority decoder after being delayed by an interval of less than the period of said clock signals.

5 Claims, 3 Drawing Sheets

SYNCHRONIZING CIRCUIT

This invention relates to synchronizing circuits for synchronizing an asynchronous serial two level signal to a clock signal.

BACKGROUND OF THE INVENTION

In any data processing system in which there are separate functional units each controlled by its own internal clocks and connected together via asynchronous interfaces, there exists the requirement that any two units must be synchronized before communication can take place on their mutual interface.

Also, when designing logic circuits it is desirable to have all signal changes synchronized to the same clocking system. This helps to avoid circuit race conditions and latch metastability problems. Where signals are received asynchronously from other systems a synchronizing circuit must be used to achieve this.

Signals feeding clocked, synchronous logic that are not synchronized with those clocks can produce erroneous results. Since such signals can change at any time within a clock cycle, the data setup and hold time specifications on the latches can be violated, thus causing oscillations or "metastability" to occur in the latches or detection of the signal to be missed. (Metastability is the condition where a latch is changing its state when the clock is turned "off", but is neither a 1 nor a 0. This condition can persist for a long period of time, depending upon the technology and latch design). All latches have data setup and hold time specifications, so this problem occurs in any clocked logic design.

The drawbacks of some of the simpler methods of using a pair of latches, each set by two separated clocks, to synchronize an input signal with the second latch clock are discussed in an article entitled "High Speed Synchronization Cicuitry" by G. Doettling et al (IBM Technical Disclosure Bulletin, Vol 30, No 9, Feb. 1988 pp 236–241). A more complex arrangement is proposed to provide synchronization with the minimum delay. This involves the use of four separate clocks and six latches and although delay is reduced, the circuit is only semi-synchronized as the output may be synchronized to either one of a pair of clocks. The circtuit is designed to synchronize "tags" where the duration of the signal to be synchronized is greater than one clock cycle.

European patent application, EPA 0141946 A2 discusses the problem of synchronizing shorter signal pulses with clock pulses where there is jitter on the incoming signal. The circuit described in the EPA, employs a delay element and applies incoming pulses both directly and after a delay to respective latches which are clocked by a clock derived from the system clock. The output of the two latches is compared and, if different indicates jitter relative to the active clock edge. If jitter is indicated, an Exclusive-Or gate to which the system clock is applied acts to modify the derived clock signal. This operates the latches such that the output of a third latch which is clocked by the system clock and receives the output of the undelayed latch, is brought and receives the output of the undelayed latch, is brought into synchronization with the input signal with no more than one initial erroneous transition.

SUMMARY OF THE INVENTION

It is therefore an object of the invention to reliably synchronize signals that have pulse widths ranging from one half of a clock cycle to an infinite width without loss of information and without unacceptable or unpredictable delays.

It is a further object of the invention to allow both positive and negative pulses to be synchronized.

It is yet a further object of the invention to achieve such synchronization with a minimum number of components.

Accordingly the invention provides a synchronizing circuit for synchronizing an asynchronous serial two level input signal to a first clock signal to produce a synchronized serial two level output signal, the circuit comprising a majority decoder to a first input of which the asynchronous input signal is applied; a first clocked latching means for latching the asynchronous input signal when enabled by a second clock signal of the same frequency as but phase shifted so as not to overlap said first clock signal, the output of said first clocked latching means being applied to a second input of said majority decoder; a second clocked latching means for latching the output of the majority decoder when enabled by said first clock to produce said synchronized output signal; a feedback path for feeding back an inverted version of said synchronized output signal to a third input of said majority decoder; and means for delaying said inverted synchronized output signal by an interval less than the period of said clock signals.

The circuit ensures that output signal transitions are synchronized to a single system clock and faithfully reproduce the input signal pattern even though the input pulse length may be as short as half a clock cycle and pulse repetition frequency may vary.

The circuit is simple and is compatible with Level Sensitive Scan Design (LSSD) guidelines.

DETAILED DESCRIPTION

Figure 1:
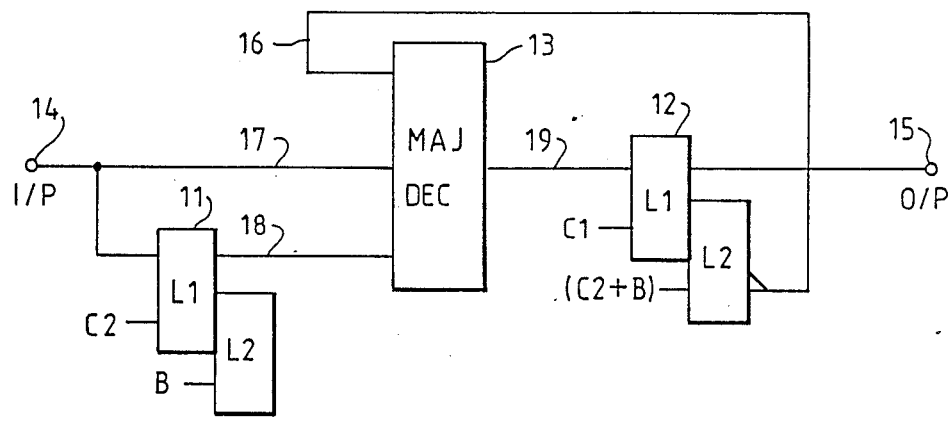
FIG. 1 is a block diagram of a synchronizing circuit according to the invention.
Figure 2:
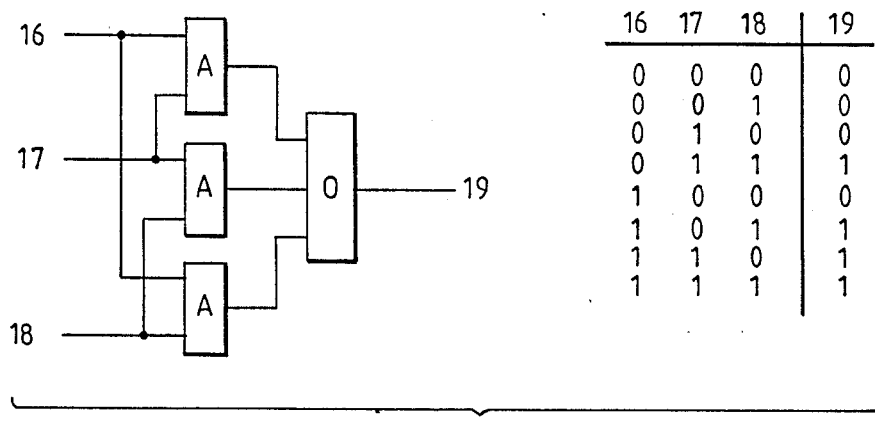
FIG. 2 is a block diagram of a majority decoder employed in the synchronizing circuit of FIG. 1, together with an associated truth table.

The basic circuit of the synchronizer is shown in FIG. 1. It consists of two Level Sensitive Scan Design (LSSD) Shift Register Latches (SRLs), 11 and 12, and a 2-out-of-3 majority decoder (vote circuit, 13. The majority decoder circuit may be implemented using three two-input AND gates and a three input OR gate, as shown in FIG. 2, together with its associated truth table.

Figure 3:
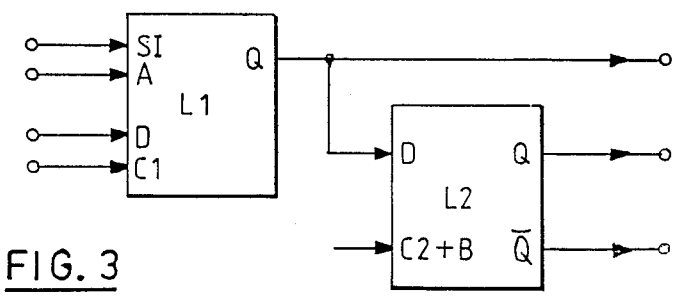
FIG. 3 is a more detailed block diagram of a Shift Register Latch schematically illustrated in FIG. 1.

A more detailed illustration of a LSSD SRL is shown in FIG. 3. Each SRL consists of two D-type latches L1 and L2. The first latch L1 has a data input, D, and first system clock input C1 which, when they coincide, set the latch to produce the normal output, Q. The output Q of L1 is applied to the D input of a second latch, L2 clocked by a second system clock C2 so that the outputs of L2 are delayed with respect to the normal output of L1.

An additional input SI to latch L1, is a scan input to permit testing of logic circuits made up of SRL's. Two additional clocks A and B are required for test purposes. This aspect of operation is not relevant to an understanding of the present invention but further information of the principles of LSSD may be found in U.S. Pat. No. 3783254 and in the comprehensive list of patents included in U.S. Pat. No. 4293919.

Figure 4:
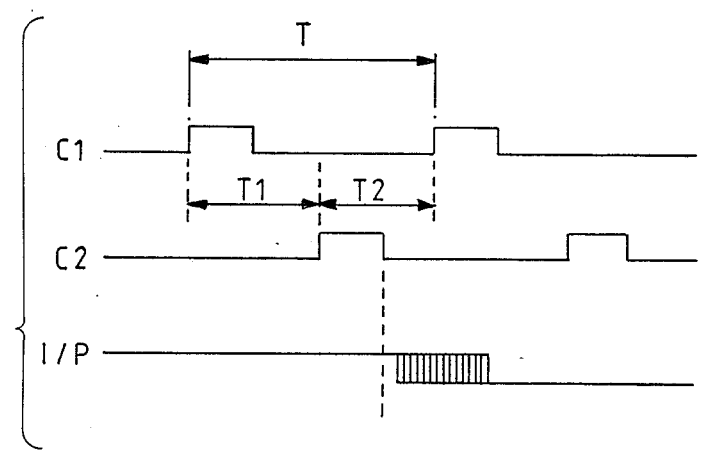
FIG. 4 is a timing showing the relative timings of two system clocks and of an input signal which just overlaps one of the clock active portions.

Returning to FIG. 1, the two SRLs 11 and 12 each use a different system clock for their L1 portion. The two clocks, C1 and C2, are non-overlapping with a period T, as shown in FIG. 4. The L2 portion of SRL 11 receives the LSSD B clock for test purposes only and has no function in the synchronizing operation whilst the clock for the L2 portion of SRL 12 is an OR of the system clock C2 and the LSSD B Clock. Ideally the clock pulse separations (T1 and T2) are equal. Detail of the clock generation and the LSSD scan path have been omitted from FIG. 1 for clarity.

The following section describes the operation of the sychronizer when a positive going asynchronous pulse is applied to the input 14.

Assume that both the input 14 and the output 15 are at 0. The inverted output of SRL 12 will be at a 1. As this is connected to input 16 of the majority decoder 13, the decoder will be sensitised to a 1 occuring on either, or both, of its other two inputs 17 and 18. This is a quiescent state of the circuit when it is waiting for a 0 to 1 transition on the asynchronous input 14. When such a transition occurs, the middle input 17 of the majority decoder will become a 1 and, as there are now two 1's on its inputs, the output 19 of the decoder will change to a 1. There are now two cases to consider, depending on how long the asynchronous input remains at a 1.

If the input of the synchronizer is at 1 when the C2 clock pulse ends, as illustrated in FIG. 4, SR1 11 will latch the input and ensure that the output of the decoder remains at a 1 for the next C2 clock period. During this time the C1 clock will cause SRL 12 to latch the output of the decoder and the output of the synchronizer will change from a 0 to a 1.

Figure 5:
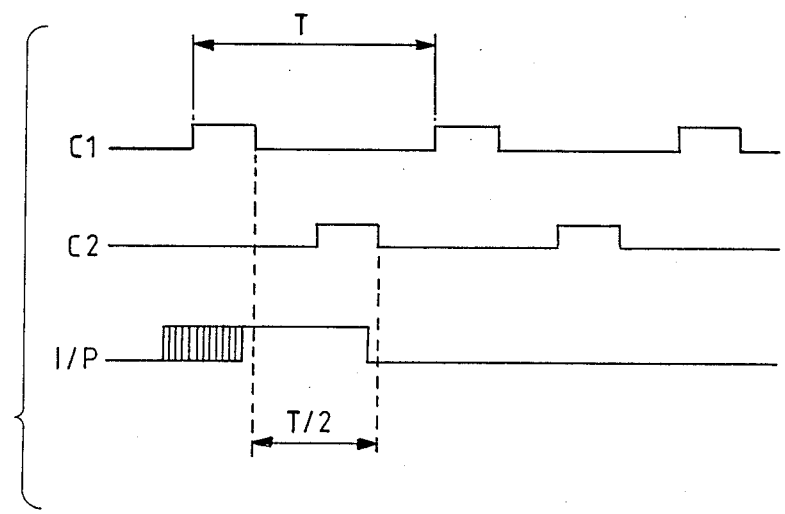
FIG. 5 is a timing diagram showing the relative timings of two system clocks and of an input signal which just misses one of the clock active portions.

However, if the input reverts to a 0 before the C2 clock pulse ends, as illustrated in FIG. 5, then it must have been at 1 when the C1 clock pulse ended (since the input pulse width must be greater than half the clock period to guarantee correct synchronisation) and it will have been latched by SRL 12 causing the output to change from a 0 to a 1.

When the output of the synchronizer becomes a 1, the synchronizer will have changed state and the leading edge of the input pulse will have been synchronized to the C1 clock.

From the above description it can be seen that by using the majority decoder and feeding back to it the inverse of the current state, the input is effectively sampled twice during each clock period (once by SRL 11 and once by SRL 12). It is this facility that allows the circuit to synchronize pulses as short as half of one clock cycle.

Examples of the operation of the circuit for several different input conditions and input pulse duration will now be described with reference to FIGS. 6 through 8.

Figure 6:
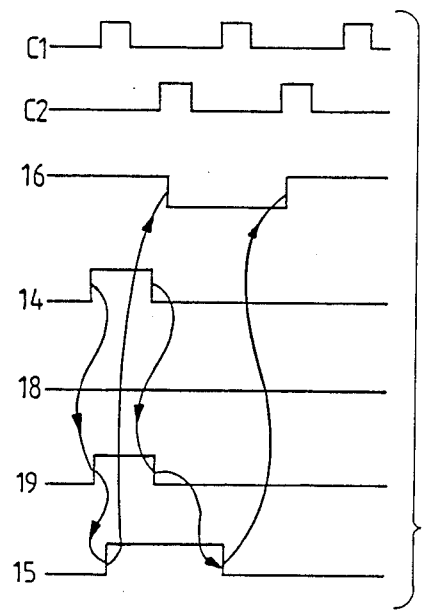
FIG. 6 is a timing diagram illustrating various waveforms occurring in the circuit of FIG. 1 for the case of a short positive input pulse spanning the principal system clock.

FIG. 6 illustrates the case of a short (i.e. less than one clock cycle) positive pulse that spans the C1 clock active portion. The sequence of operation of the circuit of FIG. 1 is as follows:

The asynchronous pulse is applied to input 14. Line 16, the inverse output of SRL 12, is already high, therefore line 19 goes high as majority decoder 13 has two highs on its inputs (16 and 17). C1 clock enables SRL 12 which latches the high on line 19 so that output 15 goes high. The input pulse now falls which causes line 19 to go low, as there are now two lows on the inputs to the detector 13. However, the output 15 of SRL 12 is still latched high at this point. When the next C2 clock enables the L2 portion of SRL 12, its inverted output 16 goes low. The next C1 clock then enables SRL 12 which latches the low condition on line 19 and hence the output terminal 15 goes low.

Finally, the next C2 clock enables the L2 portion of SRL 12 and its inverted output 16 gives high, effectively returning the circuit to is quiescent state. The short asynchronous pulse on input 14 has thus been detected and a corresponding output pulse at terminal 15 has been produced which is synchronous with the C1 clock.

Figure 7:
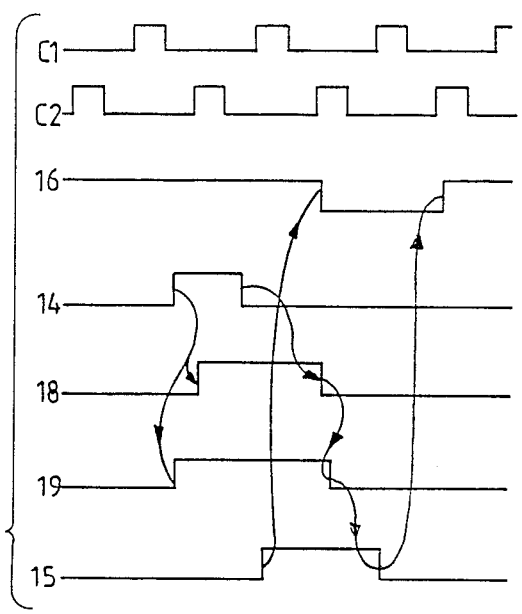
FIG. 7 is a timing diagram illustrating waveforms occurring in the circuit of FIG. 1 for the case of a short positive input pulse spanning an interleaved system clock.

FIG. 7 illustrates the case of a short positive pulse that spans the C2 clock active portion. The sequence of operation in the circuit of FIG. 1 is as follows:

The asynchronous input pulse is applied to input 14. Line 16 is already high and therefore line 19 goes high as majority decoder 13 has two highs on its inputs 16 and 17. C2 clock enables SRL 11 which latches the high input at 14, causing line 18 to go high. The input pulse now falls but line 19 stays high as there are still two highs on the inputs 16 and 18 to majority decoder 13.

The next C1 clock enables SRL 12 and latches the high on line 19, thus causing the output 15 to go high. The following C2 clock enables SRL 11 to latch the low on the input 14 causing line 18 to go low. Line 19 goes low as the decoder 13 now has 2 lows on its inputs 17 and 18. Simultaneously, C2 clock enables the L2 portion of SRL 12 and its inverted output 16 goes low. Finally C1 clock enables SRL 12 to latch the low on line 19 causing output 15 to go low.

The next C2 clock enables the L2 portion of SRL 12 causing line 16 to go high and returning the circuit to it quiescent state. The short asynchronous input pule on input 14 has been detected and a corresponding output pulse at terminal 15 has been produced which is synchronous with the C1 clock.

Figure 8:
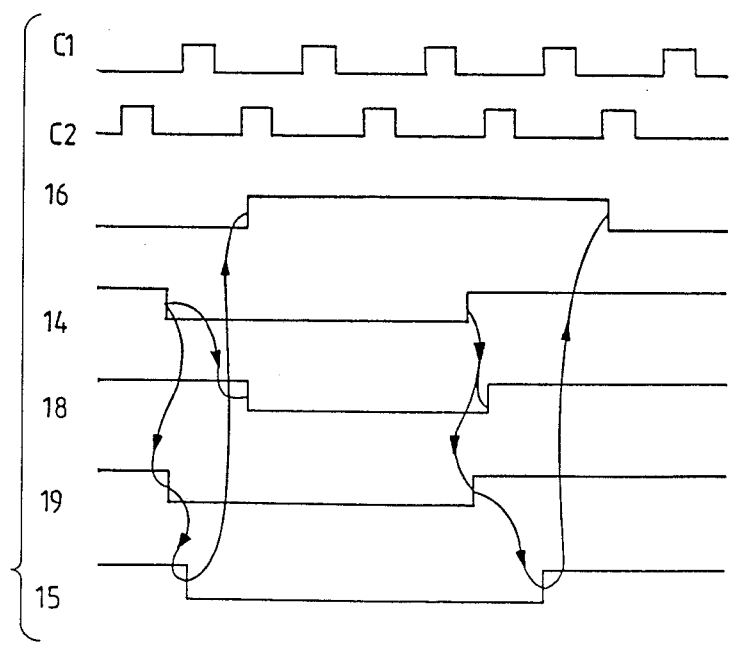
FIG. 8 is a timing diagram illustrating waveforms occurring in the circuit of FIG. 1 for the case of a long negative input pulse of greater than two clock cycles duration.

FIG. 8 illustrates the case of long (>2 clock cycles) input pulse at terminal 14. The sequence of operation in the circuit of FIG. 1 is as follows:

Initially, the circuit is quiescent with input 14 high, output 15 high and line 16 low. When the input signal at terminal 14 falls, majority decoder output 19 goes low as there are now two lows on inputs 16 and 17. The next C1 clock causes the low on line 19 to be latched by SRL 12 and output 15 thus goes low.

The following C2 clock causes SRL 11 to latch the low signal at input 14 onto line 18. Simultaneously, line 16 goes low as C2 clocks the L2 portion of SRL 12. The circuit is again quiescent with both input and output low. When input 14 next goes high, line 19 goes high as there are now two highs on the inputs 16 and 17 to majority decoder 13. Line 18 goes high as the C2 clock causes SRL 11 to latch the high input at 14. The output 15 next goes high as SRL 12 latches the high value on line 19 when clocked by C1.

Finally C2 clocks the L2 portion of SRL 12, causing feedback 16 to go low so that the circuit returns to its first quiescent state with input and output high and line 16 low. In this example, a long negative pulse has been captured and synchronized with clock C1.

From the above examples, it can be seen that this circuit is responsive to both positive and negative going transitions on its input. The circuit allows the synchronization of signals that have pulse widths that range from one half of a clock cycle to an infinite width (i.e. a step function). It uses a low number of circuit components, is completely LSSD compatible and may be 100% stuck fault tested. In its present application the circuit is being used with a clock period, T, of 200 ns. The usual parameters of the particular technology used (e.g. latch and gate propagation delay, metastability times, wiring capacitance, etc.) must also be considered when choosing the clock frequency. The circuit has, however, been simulated with a clock period of less than 20 ns allowing operation at frequencies of greater than 50 MHz. This make the circuit suitable for a wide range of applications where synchronization of external signals is required.

I claim:

1. A synchronizing circuit for synchronizing an asynchronous serial two level input signal to a first clock signal to produce a synchronized serial two level output signal, the circuit comprising
    a majority decoder to a first input of which the asynchronous input signal is applied;
    a second clock signal having the same frequency as said first clock signal and phase shifted so as to not overlap said first clock signal:
    a first clocked latching means for latching the asynchronous input signal when enabled by said second clock signal, the output of said first clocked latching means being applied to a second input of said majority decoder;
    a second clocked latching means for latching the output of the majority decoder when enabled by said first clock to produce said synchronized output signal;
    a feedback path for feeding back an inverted version of said synchronized output signal to a third input of said majority decoder; and means for delaying said inverted synchronized output signal by an interval less than the period of said first and second clock signals.

2. A synchronizing circuit according to claim 1 in which said means for delaying comprises an additional latching stage, associated with said second clocked latching means, for latching and inverting said synchronized output signal when enabled by said second clock signal.

3. A synchronizing circuit as claimed in claim 1 wherein said clock signals are spaced from each other by an interval of 50% of their repetition period.

4. A synchronizing circuit as claimed in claim 1 wherein the majority decoder is a 2 out of 3 majority decoder.

5. A synchronizing circuit as claimed in claim 1 wherein said clocked latching means are level sensitive scan design (LSSD) type latches.

* * * * *